United States Patent Office 3,489,720
Patented Jan. 13, 1970

3,489,720
USE OF METAL STANNATE POLYCONDENSATION CATALYSTS IN PREPARING POLYETHYLENE TEREPHTHALATE
John A. Price, Swarthmore, and Otto K. Carlson, Marcus Hook, Pa., assignors to FMC Corporation, Philadelphia, Pa., a corporation of Delaware
No Drawing. Filed Mar. 29, 1967, Ser. No. 626,687
Int. Cl. C08g 17/003, 17/08, 17/015
U.S. Cl. 260—75       5 Claims

ABSTRACT OF THE DISCLOSURE

Process of preparing polyethylene terephthalate resin comprising carrying out an ester-interchange reaction between ethylene glycol and dimethyl terephthalate or carrying out a direct esterification reaction between ethylene glycol and terephthalic acid and polycondensing the reaction product thereof in the presence of a metal salt of stannic acid wherein the metal component of the salt is from Groups II–B and VII–B of the Periodic Table.

---

This invention relates to an improved method for the preparation of linear polyesters. More particularly, it relates to an improved polycondensation catalyst for use in the manufacture of highly polymeric linear polyesters.

It is known that linear polyesters can be prepared from a suitable ester of a dicarboxylic acid or a dicarboxylic acid by initially reacting such a material with a diol. When an ester of a dicarboxylic acid is used as a starting material, it is first reacted with a diol in the presence of a transesterification catalyst by means of an ester-interchange reaction; whereas, when a dicarboxylic acid is used as a starting material, it is first subjected to a direct esterification reaction with a diol in the presence of what is generally called a first stage catalytic additive or ether inhibitor. In either instance, the resulting reaction product, which may be, in general, described as a polyester prepolymer, is then polycondensed in the presence of a polycondensation catalyst to form a polyester resin.

In the case of the transesterification method of preparing polyethylene terephthalate wherein ethylene glycol is reacted with dimethyl terephthalate, the first stage product of the transesterification reaction is generally described as being comprised mainly of bis-2-hydroxyethyl terephthalate. Whereas, the first stage reaction product of the direct esterification reaction between ethylene glycol and terephthalic acid is comprised of bis-2-hydroxyethyl terephthalate along with substantial quantities of higher condensates of ethylene glycol and terephthalic acid. In particular, the product of the direct esterification reaction between ethylene glycol and terephthalic acid and the product of the transesterification reaction between dimethyl terephthalate and ethylene glycol can be described as bis-2-hydroxyethyl terephthalate or a polycondensation product thereof, wherein the D.P. (degree of polymerization) varies from about 2 to about 6. However, for purposes of simplicity in describing the present invention, hereinafter the terms "polyester prepolymer" and "bis-2-hydroxyethyl terephthalate" will both denote and include within their scope the product of the direct esterification reaction between terephthalic acid and ethylene glycol and the product of the transesterification reaction between dimethyl terephthalate and ethylene glycol as set forth above.

Heretofore, various materials have been suggested as polycondensation catalysts for polycondensing the polyester prepolymer products of both the transesterification method and direct esterification method of preparing polyester resins. However, in general, none of the substances that have been suggested as polycondensation catalysts heretofore have been completely satisfactory. For example, many of the polycondensation catalysts of the prior art only catalyze the condensation reaction to a low degree and they do not promote the reaction rate sufficiently to be acceptable for commercial purposes. Therefore, such polycondensation catalysts of the prior art do not act to form polyester products having carboxyl contents as low as required for some resin uses, or molecular weights and melting points as high as desired.

From a commercial standpoint, it is essential that a polyester resin be produced in the shortest possible time and the desired degree of polymerization be obtained. In general, a polyethylene terephthalate resin suitable for melt spinning into filaments should have a carboxyl content value of about or below 50 equivalents per million grams (eq./$10^{-6}$ gr. or meq./kg.), a melting point of preferably at least about 258° to 260° C., and an intrinsic viscosity preferably not less than about 0.60 (determined in a 60% phenol and 40% tetrachloroethane solution, wt./wt., at 30° C.). However, such specification values of polyethylene terephthalate resin may be suitably higher or lower, depending on whether the resin is to be made into filaments, fibers or film and the ultimate use of such products.

It is an object of the present invention to prepare highly polymeric linear polyesters by a direct esterification reaction between a dicarboxylic acid and a diol or by a transesterification reaction between an ester of a dicarboxylic acid and a diol, so as to form a polyester prepolymer and then polycondense the resulting polyester prepolymer in the presence of an improved polycondensation catalyst.

It is another object of the present invention to prepare a highly polymeric linear polyester resin by polycondensing bis-2-hydroxyethyl terephthalate in the presence of an improved polycondensation catalyst.

These and other objects are accomplished in accordance with the present invention which involves a method for preparing highly polymeric linear polyesters wherein dimethyl terephthalate is reacted with ethylene glycol in the presence of an ester-interchange catalyst to form a polyester prepolymer or where terephthalic acid is reacted with ethylene glycol in the presence of a first stage catalytic additive to form a polyester prepolymer and where the resulting polyester prepolymer is polycondensed in the presence of a polycondensation catalyst, the improvement comprising carrying out the polycondensation of the polyester prepolymer in the presence of a catalytic amount of a suitable metal salt of stannic acid wherein the metal component of the salt is from Groups II–B, and VII–B of the Periodic Table (see Merck Index, sixth edition, inside front cover).

The metal salts of stannic acid or metal stannates that can be used as polycondensation catalysts in the present method may be suitably varied within the above limits to meet any requirements of reaction conditions and desired product. For example, among the polycondensation catalysts that can be used in accordance with the present invention are cadmium stannate, manganese stannate, and zinc stannate or any combination thereof.

The preparation of polyesters via the ester-interchange reaction is generally carried out with a molar ratio of glycol, such as ethylene glycol, to a dialkyl terephthalate, such as dimethyl terephthalate, of from about 1:1 to about 15:1, respectively, but preferably from about 1.2:1 to about 2.6:1. The transesterification reaction is generally carried out at atmospheric pressure in an inert atmosphere such as nitrogen, initially at a temperature range of from about 125° C. to about 250° C., but preferably between about 150° C. to 200° C. in the presence of a transesterification catalyst. During the first stage of this reaction, methyl alcohol is evolved and is continuously removed by distillation. After a reaction period of about 1 to 2 hours, the temperature of the reaction mixture is raised to from about 200° C. to about 300° C. for approximately one to three hours in order to complete the reaction, so as to form the desired polyester prepolymer and distill off any excess glycol.

Any known suitable transesterification or ester-interchange catalyst, for example, lithium hydride or zinc acetate, can be used to catalyze the present transesterification reaction. Generally, the transesterification catalyst is used in concentrations of from about 0.01% to about 0.20%, based on the weight of the dialkyl terephthalate used in the initial reaction mixture.

Similarly, the preparation of polyester resins via the direct esterification reaction is generally carried out with a molar ratio of glycol, such as ethylene glycol, to a dicarboxylic acid, such as terephthalic acid, of from about 1:1 to about 15:1, but preferably from about 1.2:1 to about 2.6:1. The direct esterification step is generally carried out at temperatures ranging from about 180° C. to about 280° C. in the absence of an oxygen-containing atmosphere at atmospheric or elevated pressure for about two to four hours to form the desired polyester prepolymer. For example, the reaction may be carried out in an atmosphere of nitrogen.

Any known suitable first stage direct esterification catalytic additive may be used in the direct esterification step of the present method. For example, calcium acetate or triethylamine may be used. The first stage catalytic additives are generally used in concentrations ranging from $5 \times 10^{-5}$ mole to about $5 \times 10^{-1}$ mole of catalytic additive per mole of terephthalic acid present in the initial terephthalic acid-glycol reaction mixture.

The polycondensation step of the present invention is accomplished by adding a suitable metal salt of stannic acid or metal stannate to a polyester prepolymer or bis-2-hydroxyethyl terephthalate and heating the blend thereof under reduced pressure within the range of from about 0.05 mm. to 20 mm. of mercury while being agitated at a temperature of from about 260° C. to about 325° C. for from two to four hours. A polycondensation catalyst which acts to bring about a sufficient or desired degree of polycondensation in a two hour period is generally considered a very good catalyst. In accordance with the present invention, a metal stannate is employed in an amount ranging from about 0.01% to about 0.2%, based on the weight of the polyester prepolymer to be polycondensed. Usually, it has been found that from about 0.02% to about 0.1% of a subject polycondensation catalyst is preferred in most instances. Higher or lower concentrations of a suitable metal stannate can also be used in the subject polycondensation reaction. However, when concentrations less than the above are used, its effectiveness is generally reduced, whereas if concentrations greater than this are used, no further improvement in the present method or desired product is generally obtained.

The following examples of several preferred embodiments will further serve to illustrate the present invention. All parts are by weight unless otherwise indicated.

EXAMPLE I

A blended mixture comprising 474 g. of terephthalic acid, 288 mls. of ethylene glycol and 149 mls. of triethylamine was charged into a reaction vessel equipped with a nitrogen inlet, a Dean-Starke separating apparatus, heating means, and stirring means. The reaction mixture was agitated and the temperature was raised to about 197° C. under a nitrogen blanket at atmospheric pressure. At about 190° C., a water-triethylamine azeotropic mixture started to distill off. The azeotropic mixture was continuously separated by means of the Dean-Starke apparatus, and the triethylamine recovered was continuously returned to the reaction vessel. The reaction mixture became almost clear. Then, the temperature was allowed to rise to about 220° C. over a one hour period to form a polyester prepolymer. The prepolymer product was allowed to cool under an atmosphere of nitrogen.

EXAMPLE II

Fifty grams of the prepolymer product of Example I was mixed with 0.02 g. of cadmium stannate ($CdSnO_3$) and placed in a reaction vessel. The reaction mixture was heated at about 280° C. under reduced pressure of from about 0.05 to about 0.1 mm. of mercury while under agitation for about three hours to bring about the polycondensation of the polyester prepolymer and formation of a polyester resin. The polyester resin product formed had an intrinsic viscosity of 0.79, a carboxyl content value of 18.4 (meq./kg.) and a melting point of about 263° C.

EXAMPLE III

Fifty grams of the prepolymer product of Example I was mixed with 0.02 g. of zinc stannate ($ZnSnO_3$) and placed in a reaction vessel. The reaction mixture was heated to about 280° C. under reduced pressure of from about 0.05 to about 0.1 mm. of mercury while under agitation for about three hours to bring about the polycondensation of the polyester prepolymer and formation of a polyester resin. The polyester resin product obtained had an intrinsic viscosity of 0.58, a carboxyl content value of 8.1 (meq./kg.) and a melting point of about 260° C.

EXAMPLE IV

Fifty grams of the prepolymer product of Example I was mixed with 0.02 g. of manganese stannate ($MnSnO_3$) and placed in a reaction vessel. The reaction mixture was heated at about 280° C. under reduced pressure of from about 0.05 to about 0.1 mm. of mercury while under agitation for only about two hours to bring about the polycondensation of the polyester prepolymer and formation of a polyester resin. The polyester resin product formed had an intrinsic viscosity of 0.56, a carboxyl content value of 13.8 (meq./kg.) and a melting point of about 263° C.

EXAMPLE V

A mixture comprising 600 g. of dimethyl terephthalate, 396 mls. of ethylene glycol and 0.24 g. of lithium hydride was charged into a reaction vessel equipped with a nitrogen inlet, heating means and stirring means. The reaction mixture was agitated and heated at atmospheric pressure at 198° C. under a nitrogen blanket. The reaction mixture was held at about 198° C. for about two hours, during which time by-product methyl alcohol was distilled off. Then the temperature of the reaction mixture was allowed to rise to 230° C. over a period of about one hour to distill off any remaining by-product methyl alcohol and ethylene glycol and form a polyester prepolymer. The prepolymer product was allowed to cool under an atmosphere of nitrogen.

EXAMPLE VI

Fifty grams of the prepolymer product of Example V was mixed with 0.02 g. of cadmium stannate ($CdSnO_3$) and placed in a reaction vessel. The reaction mixture was heated to about 280° C. under reduced pressure of about from 0.05 to about 0.1 mm. of mercury while under agitation for about three hours to bring about the polycondensation of the polyester prepolymer and formation of the polyester resin. The resulting resin product had an intrinsic viscosity of 0.73, a carboxyl content value of 13.5 (meq./kg.) and a melting point of about 262° C.

EXAMPLE VII

Fifty grams of the prepolymer product of Example V was mixed with 0.02 g. of manganese stannate ($MnSnO_3$) and placed in a reaction vessel. The reaction mixture was heated to about 280° C. under reduced pressure of about from 0.05 to about 0.1 mm. of mercury while under agitation for about three hours to bring about the polycondensation of the polyester prepolymer and formation of the polyester resin. The resulting resin product had an intrinsic viscosity of 0.87, a carboxyl content value of 19.0 (meq./kg.) and a melting point of about 261° C.

The intrinsic viscosity of the polyester resin products of the above examples was measured in a 60% phenol and 40% tetrachloroethane solution (wt./wt.) at 30° C.

The process of the present invention has been described with particular reference to polyethylene terephthalate, but it will be obvious that the subject invention includes within its scope other polymeric polyethylene terephthalates formed from glycols of the series $HO(CH_2)_nOH$, where $n$ is 2 to 10 and terephthalic acid or esters thereof and copolyesters containing varied amounts of other suitable dicarboxylic acids or esters thereof, such as isophthalic acid.

The polyester resins produced in the above examples were characterized by their suitably high molecular weights, as indicated by their intrinsic viscosities, high melting points, and low carboxyl content values, thereby making such resins particularly suitable for manufacture into films and filaments that would have acceptable properties for commercial use.

It will be apparent that various different embodiments can be made practicing this invention without departing from the spirit and scope thereof, and therefore, it is not intended to be limited except as indicated in the appended claims.

We claim:

1. In a process of preparing polyethylene terephthalate resin wherein dimethyl terephthalate is reacted with ethylene glycol in the presence of an ester-interchange catalyst to form a polyester prepolymer or where terephthalic acid is reacted with ethylene glycol in the presence of a first stage catalytic additive to form a polyester prepolymer and where the resulting polyester prepolymer is polycondensed in the presence of a polycondensation catalyst, the improvement comprising carrying out the polycondensation of the polyester prepolymer in the presence of a catalytic amount of a metal salt of stannic acid wherein the metal component is from Groups II–B and VII–B of the Periodic Table (Merck Index, sixth edition).

2. The process of claim 1 wherein the metal salt is present in an amount of from about 0.01% to about 0.2%, based on the weight of the polyester prepolymer.

3. The process of claim 1 wherein the metal salt is cadmium stannate.

4. The process of claim 1 wherein the metal salt is manganese stannate.

5. The process of claim 1 wherein the metal salt is zinc stannate.

References Cited

UNITED STATES PATENTS 3,036,043   5/1962   Gruschke et al. _____ 260—75

WILLIAM H. SHORT, Primary Examiner

L. P. QUAST, Assistant Examiner